US00RE36307E

United States Patent [19]

Marin et al.

[11] E Patent Number: Re. 36,307

[45] Reissued Date of Patent: Sep. 21, 1999

[54] MULTI-LAYER POWER CABLE WITH METAL SHEATH FREE TO MOVE RELATIVE TO ADJACENT LAYERS

[75] Inventors: Carlo Marin, Vigevano, Italy; Fabrizio Marciano-Agostinelli, Columbia, S.C.; Paul K. dePratter, Greenwood, S.C.; Frank L. Kuchta, Columbia, S.C.

[73] Assignee: Pirelli Cable Corporation, Lexington, S.C.

[21] Appl. No.: 08/522,979

[22] Filed: Sep. 1, 1995

Related U.S. Patent Documents

Reissue of:

[64] Patent No.: 5,281,757
Issued: Jan. 25, 1994
Appl. No.: 07/936,354
Filed: Aug. 25, 1992

[51] Int. Cl.[6] ..... H01B 7/28

[52] U.S. Cl. ..... 174/23 R; 174/102 SC; 174/106 SC; 174/107; 174/120 SC

[58] Field of Search ..... 174/23 R, 102 SC, 174/106 SC, 107, 120 SC, 105 SC, 23 C

[56] References Cited

U.S. PATENT DOCUMENTS

| | | | |
|---|---|---|---|
| 298,751 | 5/1884 | Harrington | 174/109 |
| 306,513 | 10/1884 | Patterson | 174/107 |
| 1,755,930 | 4/1930 | Middleton | 174/114 R |

(List continued on next page.)

FOREIGN PATENT DOCUMENTS

| | | | |
|---|---|---|---|
| 107433 | 5/1984 | European Pat. Off. | 174/23 C |
| 0375101 | 6/1990 | European Pat. Off. . | |
| 2356248 | 7/1977 | France . | |
| 2377689 | 8/1978 | France | H01B 7/28 |
| 2732652 | 1/1978 | Germany . | |
| 3306501 | 2/1987 | Germany . | |
| 1375677 | 11/1974 | United Kingdom . | |

OTHER PUBLICATIONS

No. Pub. Date.

Kenneth E. Bow, The Development of Underjacket Moisture Barrier Cable as a Counter Measure Against Treeing Reprinted from IEEE Transactions on Power Delivery, vol. 5, No. 1, Jan. 1990.

Macromelt Hotmelts Multi–Layer Energy Cables, Information, Duesseldorf, Apr. 1988.

Data Sheets and material safety data sheets describing TPX 20–030 and MACROMELT® 6239, May 1988.

Dow Technical Information Seam Sealing with Hot Melt Adhesives dated Oct. 24, 1990.

Minutes of the Meeting, Insulated Conductors Committee of the IEEE Power Engineering Sociaty 82nd Meeting, Columbus, Ohio, Apr. 17–20, 1988.

EPRI Report—Development of Moisture Barriers for Extruded Dielectric Transmission Cables—Jun. 1990.

Sunazuka et al—Development of Meta–Seal SP Cable—Fujikura Technical Review, pp. 24–35–1981.

*Primary Examiner*—Kristine Kincaid
*Assistant Examiner*—Chau N. Nguyen
*Attorney, Agent, or Firm*—Norris Mc Laughlin & Marcus; L. P. Brooks

[57] ABSTRACT

An electrical power cable with a stranded conductor, a semi-conductive stress control layer around the conductor, a layer of insulation around the stress control layer, a semi-conductive insulation shield laser around the layer of insulation, an imperforate metal strip with overlapping edge portions around the shield layer and a polymeric jacket around the metal strip. The strip is free to move with respect to the jacket and the shield layer with expansion and contraction of the cable elements with temperature changes, and the overlapping edge portions of the strip are bonded together by an adhesive which permits the edge portions to move relative to each other with such temperature changes without creating fluid passageways between the edge portions. A cushioning layer can be between the shield layer and the strip and preferably, the cable is water sealed.

12 Claims, 1 Drawing Sheet

U.S. PATENT DOCUMENTS

| | | | |
|---|---|---|---|
| 2,134,771 | 11/1938 | Aime | 156/56 |
| 2,164,168 | 6/1939 | Wertzheiser et al. | 174/109 |
| 2,492,568 | 12/1949 | Gillis | 174/102 D |
| 3,312,775 | 4/1967 | Lambert | 174/102 R |
| 3,574,016 | 4/1971 | Wahlbert | 156/54 |
| 3,638,306 | 2/1972 | Padowics | 29/624 |
| 3,651,244 | 3/1972 | Silver et al. | 174/36 |
| 3,823,747 | 7/1974 | Dembiak et al. | 138/141 |
| 3,943,271 | 3/1976 | Bahder et al. | 174/23 R |
| 4,035,211 | 7/1977 | Bill et al. | 156/54 |
| 4,130,450 | 12/1978 | Bahder et al. | 156/48 |
| 4,145,567 | 3/1979 | Badher et al. | 174/107 |
| 4,256,921 | 3/1981 | Bahder | 174/107 |
| 4,327,248 | 4/1982 | Campbell | 174/107 |
| 4,569,704 | 2/1986 | Bohannon, Jr. et al. | 156/48 |
| 4,622,092 | 11/1986 | Bahannon, Jr. et al. | 156/461 |
| 4,703,132 | 10/1987 | Marciano-Agostinelli et al. | 174/23 C |
| 4,963,695 | 10/1990 | Marciano-Agostinelli et al. | 174/23 C |
| 5,010,209 | 4/1991 | Marciano-Agostinelli et al. | 174/23 C |
| 5,039,197 | 8/1991 | Rawlyk | 385/102 |
| 5,043,538 | 8/1991 | Hughey, Jr. et al. | 174/107 |
| 5,053,582 | 10/1991 | Terakawa et al. | 174/36 |
| 5,188,883 | 2/1993 | Rawlyk | 428/189 |

MULTI-LAYER POWER CABLE WITH METAL SHEATH FREE TO MOVE RELATIVE TO ADJACENT LAYERS

Matter enclosed in heavy brackets [ ] appears in the original patent but forms no part of this reissue specification; matter printed in italics indicates the additions made by reissue.

The invention relates to high voltage, electrical power cables having an imperforate metal shield which is formed by a continuous metal strip, corrugated or smooth, with overlapping edge portions, and which is around a core comprising a conductor and stress control layers and insulation around the conductor and to bonding of the overlapping edge portions together to prevent the ingress of moisture between such edge portions.

BACKGROUND OF THE INVENTION

Electrical power cables having a longitudinally folded, corrugated or smooth, metallic shielding tape with overlapping edge portions or abutting, or subtantially abutting, edge faces are well known in the art. See, for example, U.S. Pat. Nos. 3,651,244; 3,943,271 and 4,130,450. Such cables include a central stranded conductor with a semi-conducting shield therearound which is covered by a layer of insulation. Insulation shielding, in the form of a semi-conducting layer, is around the insulation, and a longitudinally folded, smooth or corrugated metallic tape is around the insulation shield. A protecting jacket is disposed around the metallic tape.

It is also known in the art that when the insulation of such cables is exposed to moisture, and in conjunction with high electrical stresses and high temperatures, "electrochemical trees" more commonly referred to as "water trees" are formed in the insulation which may result in premature cable failure.

It is known that the introduction of a sealant material between the strands of the conductor and between the insulation shield and the metallic shielding tape prevents or minimizes the longitudinal propagation of water within the cable structure. See said U.S. Pat. Nos. 3,943,271 and 4,130,450. However, it has been found that the mere introduction of sealant into such spaces is not entirely satisfactory when the sealant is merely asphalt/rubber or a polyester compound which is not water swellable.

For example, voids may be formed in the sealant during the application thereof or may be formed when the cable is punctured accidentally. Furthermore, the components of such a cable, being made of different materials, have different coefficients of expansion and the components are subjected to different or varying temperatures during manufacture, storage and/or operation of the cable which can cause the formation of voids.

In addition, when the edge portions of the metallic shielding tape overlap, there is a small space between the overlapping tape and the insulation shield adjacent to the edge of the underlying tape and there may be some spaces between the overlapping edge portions of the tape. If the tape is corrugated, there are spaces between the humps of the corrugations and the insulation shield. Such spaces may not be completely filled by the sealant when it is applied, but even if they are, voids can develop at such spaces when the cable, or its components, is subjected to temperature changes, expansion and bending.

Any such voids form locations for the retention of moisture which can cause the formation of the deleterious "electrochemical trees" in the cable insulation, and the conventional sealants used in the cables, being unaffected physically by water, cannot eliminate such voids.

Progress has been made to elmsnate the longitudinal propagation of moistare problem by including a water swellable materal in the sealant and at the overlapping portions or the metal shield strip. See, for example, U.S. Pat. Nos. 4,963,695 and 5,010,209. While such efforts have resulted in improved results, there still can be problems of moisture ingress at the overlapping portions of the metal shield strip due to the fact that in operation, the cable temperature can vary depending on the current carried by the cable conductor, e.g. from ambient temperature to a conductor temperature of 130° C., which means that the components of the cable expand and contract. However, the expansion coefficients of the materials of adjacent cable layers can differ. For example, the volume expansion coefficient of insulating or semi-conducting materials can be thirty times the expansion coefficient of the metal usually used for the metal shield, e.g. copper or aluminum. Therefore, the layers expand at different rates, and if the metal shield is constricted, it can buckle and/or not return to its original size when cooled after heating, leaving voids which are deleterious to the electrical characteristics of the cable.

U.S. Pat. No. 3,943,271 suggests overcoming the possible rupture on the metal shield problem by not bonding the overlapping edge portions of the metal shield to each other and by flooding the interior of the cable with a sealant. However, such construction does not prevent moisture from entering into the interior of the metal shield because of gaps or channels produced between the overlapping edge portions with temperature cycling of the cable.

U.S. Pat. No. 4,145,567, naming two of the inventors named in U.S. Pat. No. 3,943,271, is stated to disclose an improvement over the construction shown in the latter patent, thereby recognizing that the construction disclosed in Pat. No. 3,943,271 does not provide a complete solution to the expansion and moisture ingress problems. In the cable construction described in Pat. No. 4,145,567, the overlapping edge portions are bonded together, such as by solder, welding, epoxy resin, etc., so that they cannot move with respect to each other, and the expansion problem is met by a cushioning layer between the cable core and the metal shield. However, the jacket adheres to the metal shield which either restricts expansion of the metal shield or the bond is ruptured with temperature cycling due to the expansion of the core. The patent also does not recognize problems with buckling of the metal shield when the overlapping edges of the metal strip cannot move with respect to each other.

BRIEF SUMMARY OF THE INVENTION

In accordance with the invention, the metal shield, which is made of a strip of metal with overlapping edge portions and which is intermediate the cable jacket and the cable core, is not bonded to the adjacent layers so that it is free to move with respect to the adjacent layers and has the overlapping edge portions bonded together by an adhesive which permits the overlapping edge portions to move relative to each other with repeated temperature cycling from ambient temperature to a temperature of 130° C. without rupture of the bond and without the formation of passageways or channels for the ingress of moisture between the overlapping edge portions.

In the preferred embodiment, any otherwise empty spaces within the metal shield are filled with a sealant of the type described in U.S. Pat. No. 4,703,132 or with water swellable particles as described in U.S. Pat. No. 4,963,695.

A cushioning layer of the type described in said U.S. Pat. No. 4,145,567 may be applied between the metal shield and the cable core.

Preferably, the metal strip which forms the metal shield is bare copper, aluminum or steel which does not bond to the materials of the adjacent layers normally used for such cables. However, the metal strip may be coated with a material which does not bond to the adjacent layers or which does not bond to the metal shield strip.

As used herein, the expressions "does not bond" and "free to move", mean that the movement of the metal shield relative to the adjacent layers is not significantly restricted except by friction between the layers when the cable is subjected to heating and cooling cycles encountered when the cable is in use to transmit electrical power.

While other adhesives having the required characteristics can be used to bond the overlapping edge portions of the metal strip together, it is preferred that hot melt adhesives of the type described hereinafter be used.

The invention will be described in connection with a metal shield which is formed by longitudinally folding a metal strip around a cable core with the strip edges extending generally parallel to the longitudinal axis of the core, but it will be understod that the strip edges can be differently oriented. In each case, edge portions of the strip are overlapping.

Figure 1:
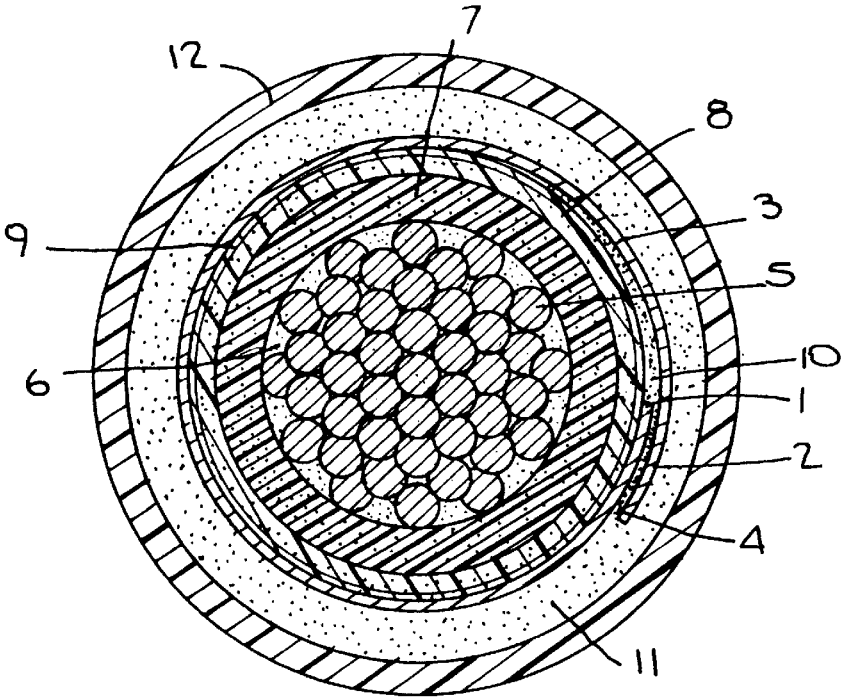
FIG. 1 is a cross-sectional view, perpendicular to the longitudinal axis of the cable, of one embcdiment of the cable of the invention.

FIG. 1 corresponds to FIG. 5 of U.S. Pat. No. 4,963,695 but instead of water swellable particles between the edge portions 1 and 2 of the metal shield 3, the edge portions 1 and 2 of the metal strip forming the shield 3 are bonded together by an adhesive 4 (FIG. 1) which permits the edge portions 1 and 2 to move relative to each other when the temperature of the conductors 5 varies from ambient temperature, e.g. 25° C., to the temperature that they reach in service and under emergency or overload conditions, e.g. 130° C., without rupture of the bond between the adhesive 4 and the overlapping edge portions 1 and 2 or the formation of passageways or channels in the adhesive 4 which permit moisture to pass from exteriorly of the shield 3 to the interior thereof.

The conductors 5, which can be copper or aluminum wires, are stranded and in conductive contact with each other. In the preferred embodiment, any spaces between or around the conductors 5 are filled with a sealing compound 6 of the type disclosed in U.S. Pat. No. 4,703,132 or with water swellable particles, to resist axial migration of moisture.

The conductors 5 and the sealing compound 6 are encircled by a conductor stress control layer 7 of semiconductive polymeric material, and the layer 7 is encircled by a layer 8 of polymerc insulation. The insulation layer 8 is encircled by an insulation stress control layer 9 of semiconductive polymeric material.

The metal shield 3 contacts the insulation stress control layer 9 except at the space adjacent the end of the inner portion 1 which, preferably, is filled with a sealing compound or water swellable material 10, of the type described hereinbefore, to prevent axial migration of moisture However, the metal shield 3 is not bonded to the layer 9.

As described hereinafter, a cushioning layer of the type described hereinbefore can be included between the metal shield 3 and the insulation stress control layer 9, in which event th sealing compound or water swellable particles 10 may not be necessary. The metal shield is free to move with respect to such a cushioning layer.

The embodiment shown in FIG. 1 includes a sealing compound or water swellable particles 11 of the type identified hereinbefore between the metal shield 3 and a jacket 12 of polymeric material. With the flowable type of sealing compound or water swellable particles previously described, the metal shield 3 is free to move with respect to the jacket 12. However, the layer 11 can be omitted since the metal shield 3 is moisture impervious, but in this case, the shield 3 is not bonded to, and is free to move relative to, the jacket 12 even though they are in contact with each other.

Figure 2:
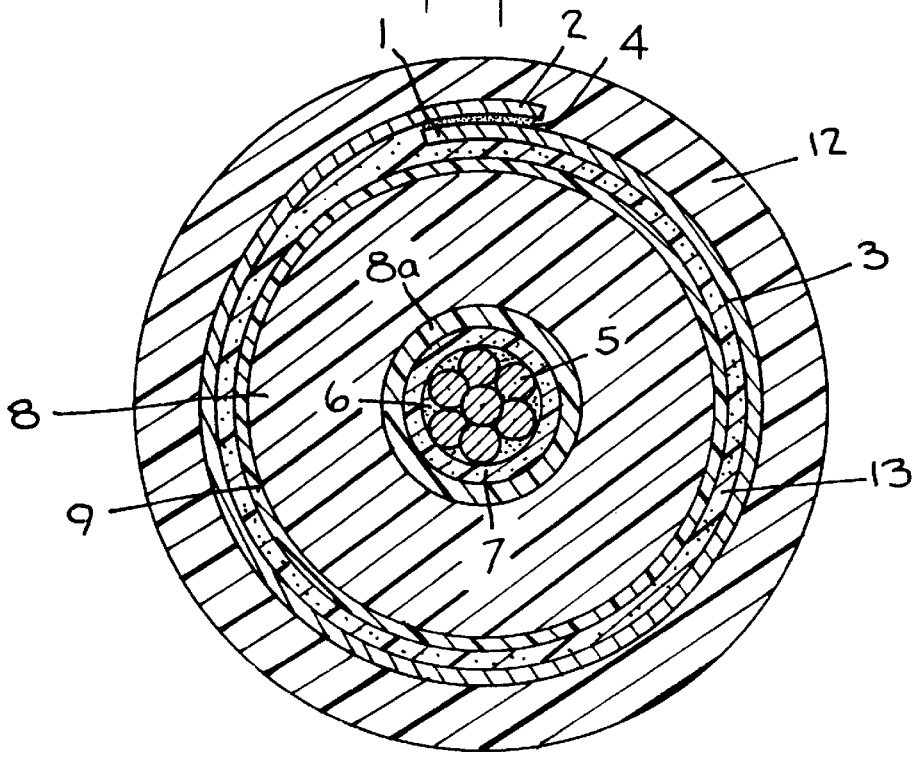
FIG. 2 is similar to FIG. 1 and illustrates another embodiment of the invention.

A further embodiment of the invention is illustrated in FIG. 2 in which the reference numerals designating the same parts are the same as those in FIG. 1. The embodiment shown in FIG. 2 differs from the embodiment shown in FIG. 1 in the omission of the sealing compound or water swellable particles 10, the omission of the sealing compound or water swellable particles 11 and the addition of a cushioning layer 13 between the metal shield 3 and the insulation stress control layer 9.

The cushioning layer 13 can be of the type described in U.S. Pat. No. 4,145,567.

In each of the embodiments of the invention, the metal shield 3 is free to move with respect to the insulation shield layer 9 and the jacket 12, that is, no adhesive is used to bond the metal shield 3 to the layer 9 and the jacket 12 and the materials of the shield 3, the layer 9 and the jacket 12 are such that they do not bond to the shield 3. Plastic materials normally used for the jacket 12 and the insulation screening layer 9, such as polyethylene and certain other materials, do not bond to bare copper, aluminum or steel. Thus, the metal shield 3 is restrained with respect to movement relative to the layer 9 and the jacket 12 only by friction between the metal shield 3 and the layer 9 and the jacket 12 which is insufficient to prevent movement of the metal shield 3 with respect to the layer 9 and the jacket 12 with the temperature cycling to which the cable is subjected in operation, e.g. normally, 20° C.–90° C. but under overload or emergency conditions, the conductor 5 temperature can be as high as 130° C. with lower temperatures at layers surrounding the conductor, e.g. 110° C. at the metal shield 3. Therefore, there is no buckling or other undesired anomalies of the corrugated metal caused by such restraint as the temperature rises and the metal shield 3 is able to return to its original size and shape when the cable cools. Furthermore, there is no rupturing or cracking of the jacket 12.

An important aspect of the invention is the selection of the adhesive 4 used to bond the overlapping edge portions 1 and 2 of the shield 3 together. The use of epoxy resins, solder, welding and similar bonding is unsatisfactory because the bond is either too strong causing buckling, etc of the shield 3 or fractures under the forces encountered with the thermal expansion of the shield 3 and/or the forces applied thereto by the layers within the shield 3 which have much higher coefficients of expansion, e.g. 30 times higher. Furthermore, if the bonding material fractures, it provides moisture channels extending from the exterior of the shield 3 to the interior thereof, thus invalidating the water tightness of the cable structure.

Adhesives which can withstand small forces, i.e. the forces when the temperature range is significantly less than the normal cable operating range, without fracturing and which permit the edge portions 1 and 2 to move relative to each other, are inadequate for the desired bonding purposes not only because they fracture and/or elongate without returning to the original state when the cable is subjected to heating from about 20° C. to 90° C. or to 110° C. and then cooled.

Thus, in accordance with the invention, the metal shield 3 is not bonded to the insulation shield layer 9 or the jacket 12 so as to avoid the problems encountered with such bonding, and the edge portions 1 and 2 are bonded together by an adhesive which is selected so that the edge portions 1 and 2 can move relative to each other with temperature cycling of the cable in the range from about 20° C. to at least 90° C. and preferably, to at least a cable conductor temperature of 130° C., which does not fracture or be caused to produce moisture channels therein with such cycling, which remains intact and returns substantially to the form which it had prior to heating when the cable is cooled to about 20° C. after heating and which does not cause stretching of the metal shield. The adhesive must have such characteristics with numerous temperature cycles, i.e. from the lowest to the highest temperature and vice versa, such as at least 14 cycles, one each day.

A further advantage of the cable of the invention is that because there is no bond between the metal shield 3 and the adjacent jacket 12 and the insulation shield layer 9, the jacket 12 can be readily stripped from the metal shield 3 and the metal shield 3 can be readily stripped from the cable core.

Although other adhesives may be appropriate, we have found that hot-melt adhesives, which exhibit elastomeric properties at room temperature and which increase in elasticity with an increase in temperature are especially suitable.

We have found that the minimum requirements for hot melt adhesives are as follows:

Viscosity : 2000 mPa.s (milli-Pascal seconds) minimum at 175 degrees centigrade tested per ASTM D3236

Ultimate Tensile Strength: 300 psi minimum at room temperature

Elongation: 250% minimum at room temperature

Softening point without melting: 80° C.

Application temperature: above 130° C.

Other characteristics need to be evaluated on a case by case basis. For example, a hot melt with a high tensile and elongation may require a low yield point and modulus whereas a hot melt with a low tensile and elongation may require a high yield point and modulus. Hot melts with a softening point above 115° C. would be desirable to exhibit a low shear modulus to allow expansion without rupture while a hot melt with a softening point below 115° C. would be desirable to exhibit a high shear modulus and may require a high viscosity to reduce the potential to flow.

Adhesives which meet such requirements may be selected from thermoplastic polymer adhesives, such as, polyamides polyesters, polyethylene vinyl acetate, polyolefins and mixtures of such adhesives.

A preferred hot melt adhesive which is sold under the trade name MACROMELT TPX-20-230 by Henkel Corporation, South Kensington Road, Kankakee, Ill. has the following characteristics:

Viscosity (ASTMD-3236): 7000 mPas @ 180° C.

Ultimate Tensile Strength: 1070 psi @ 25° C.

Elongation: 780% @ 25° C.

Softening point: approximately 115° C.

Application temperature: 180°–210° C.

Yield point: 20 psi

2% modulus: 140 psi

Another satisfactory hot melt adhesive is MACROMELT TPX-20-233 sold by Henkel Corporation and has the following characteristics:

Ultimate Tensile Strength: 390 @ 25° C.

Elongation: 340% @ 25° C.

Softening point: approx. 140° C.

Application temperature: 180°–210° C.

Yield point: 320 psi

2% modulus: 2360 psi

Other satisfactory adhesives which can be employed are MACROMELT Q3265, MACROMELT 6300 and MACROMELT 6245 and an adhesive sold under the trade name NUMEL by Baychem Inc., 1960 West, Houston Tex., and have the following charactertstics:

| Adhesive | Softening Point | Appln. Temp. |
|---|---|---|
| MACROMELT Q3265 | 104° C. | 160–180° C. |
| MACROMELT 6300 | 150–205° C. | 240–265° C. |
| MACROMELT 6245 | 110–120° C. | 193–215° C. |
| NUMEL 5430 | 154° C. | 205–225° C. |
| NUMEL 3422 | 130° C. | 175–195° C. |

Although hot melt adhesives which will soften in the temperature range to which the shield 3 is subjected, hot melt adhesives with a softening point above 115° C. are satisfactory provided the adhesive will stretch without rupture or delaminate from the shield.

Hot melt adhesives with a softening point below 115° C. are satisfactory as long as they do not flow and destroy the integrity of the overlap. Generally, a softening point down to 80° C. will be acceptable as the melt temperature will be above the operating temperature range. Additionally, 80° C. is the maximum normal operating temperature to which the shield is subjected.

In the event that a cushioning layer 13 is employed as described hereinbefore, an adhesive of the type described will be used but the properties thereof which are required are less stringent because the bond between the edge portions 1 and 2 is not subject to forces as large as those encountered when the cushioning layer 13 is omitted. Although the cushioning layer 13 may be extruded over the insulation screening layer 9, it may also be applied as a helically wound or longitudinally folded tape, with or without overlap. If desired, the cushioning layer 13 may be a water swellable tape of a type known in the art or water swellable powder of the type described hereinbefore instead of a foamed plastic material.

Although preferred embodiments of the present invention have been described and illustrated, it will be apparent to those skilled in the art that various modifications may be made without departing from the principles of the invention.

What we claim is:

1. In an electrical power cable operable throughout a predetermined temperature range and comprsing a stranded conductor formed by a plurality of wires stranded together and in conductive contact with adjacent wires, a semi-conductive stress control layer around said conductor, a layer of insulation around said stress control layer, a semiconductive insulation shield layer around said layer of insulation, an imperforate metal shield around said shield layer, said metal shield to being formed by a metal strip with overlapping edge portions, and a jacket of polymeric material around said metal shield, wherein the improvement comprises a metal shield which is free to move with respect to said insulation shield layer and said jacket with expansion and contraction of said metal shield, said semi-conductive stress control layer, said insulation, said insulation shield layer and said jacket when said cable is subjected to temperature changes in said predetermined range and an adhesive bonding said overlapping edge portions together, said adhesive permitting said edge portions to move relative to each other without causing a fluid passageway between said edge portions when said cable is subjected to temprature changes in said predetermined range whereby fluid is prevented from passing between said overlapping edge portions and buckling and fractures of said metal shield is prevented even though said cable is subjected to repeated temperature changes within said range.

2. An electrical power cable as set forth in claim 1 wherein said metal shield is free of a bond with said jacket, whereby said jacket may be readily stripped from around said metal shield. and is free of a bond with said insulation shield layer.

3. An electical power cable as set forth in claim 2 wherein said adhesive is a hot melt adhesive which has a predetermined softening temperature and an application temperature higher than said predetermined softening temperature and higher than the highest temperature in said predetermined range.

4. An electrical power cable as set forth in claim 1 wherein said metal strip is bare and is selected from the group of metals consisting of copper, aluminum and steel.

5. An electrical power cable as set forth in claim 4 wherein said adhesive is a hot tneli adhesive which has a predetermined softening temperature and an application temperature higher than said predetermined softening temperature and higher than the highest temperature in said predetermined range.

6. An electrical power cable as set forth in claim 1 wherein said adhesive has the following properties:

Viscosity: Min. 2000 mPas @ 175° C.

Ultimate tensile strength: Min. 300 psi @ 25° C.

Elongation: Min. 250% @ 25° C.

Softening point without melting: *Min.* 80° C.

Application temperature: at least 130° C.

7. An electrical power cable as set forth in claim 1 wherein said adhesive has the following properties:

Viscosity: 2000–7000 mPas in the range 175°–180° C.

Ultimate tensile strength: 300–1100 psi @ 25° C.

Elongation: 250–780% @ 25° C.

Softening point without melting: 80°–205° C.

Application temperature: 130°–265° C.

8. An electrical power cable as set forth in claim 1 wherein said adhesive has a softening temperature in said predetermined temperature range and a melting temperature and an application temperature above said predetermined temperature range.

9. An electrical pwoer cable as set forth in claim 1 wherein any otherwise empty spaces within said jacket are filled with water sealing material.

10. An electrical power cable as set forth in claim 1 further comprising a cushioning layer around said insulation shield layer and intermediate said insulation shield layer and said metal shield.

11. An electrical power cable as set forth in claim 10 wherein said cushioning layer is a layer of tape containing a water swellable material.

12. An electrical power cable as set forth in claim 1 further comprising water swellable particles intermediate said insulation shield layer and said metal shield.

* * * * *